United States Patent [19]
Kautz

[11] Patent Number: 5,835,806
[45] Date of Patent: *Nov. 10, 1998

[54] PASSIVE SELF-CONTAINED CAMERA PROTECTION AND METHOD FOR FIRE DOCUMENTATION

[75] Inventor: James L. Kautz, Missoula, Mont.

[73] Assignee: The United States of America as represented by the Secretary of Agriculture, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 806,592

[22] Filed: Feb. 26, 1997

[51] Int. Cl.$^6$ ........................................... G03B 29/00
[52] U.S. Cl. .............................. 396/419; 165/47; 348/83
[58] Field of Search ........................... 396/419, 427; 348/82, 83, 84, 85, 143; 359/503, 894, 895; 206/316.1, 316.2

[56] References Cited

U.S. PATENT DOCUMENTS

| | | | |
|---|---|---|---|
| 4,616,694 | 10/1986 | Hsieh | 165/47 |
| 5,056,603 | 10/1991 | Parkinson | 169/48 |
| 5,162,906 | 11/1992 | Yorita et al. | 348/83 |
| 5,519,543 | 5/1996 | Olsson et al. | 359/894 |

Primary Examiner—Howard B. Blankenship
Attorney, Agent, or Firm—Janet I. Stockhausen; M. Howard Silverstein; John D. Fado

[57] ABSTRACT

A self-contained camera enclosure provides protection from intermittent exposure to high temperatures and fire. The protection is provided without connection to electricity or water, and is practical for use in remote areas. Protection is provided by a heat-reflecting outer box containing a liner of insulating material and a frozen-liquid cooling system. A double-pane window using an outer heat-resistant glass and an inner hot mirror allow visible light to enter the enclosed camera while simultaneously blocking heat transmission. To accommodate remote camera equipment, a four-ply thermal insulation is used to protect the cable extending from the enclosure. The enclosure can accommodate different models and types of camera equipment.

7 Claims, 3 Drawing Sheets

5,835,806

PASSIVE SELF-CONTAINED CAMERA PROTECTION AND METHOD FOR FIRE DOCUMENTATION

FIELD OF THE INVENTION

The present invention relates to camera protection, and particularly to a passive, self-contained enclosure to thermally isolate a camera from intermittent high-temperature environments for visual fire documentation, especially of fires occurring in wildlands, vehicles, or shelters.

STATEMENT REGARDING FEDERALLY SPONSORED RESEARCH AND DEVELOPMENT

BACKGROUND OF THE INVENTION

When fire fighters are in remote areas, it is imperative that they know where to take refuge if a firestorm sweeps through their location, as can happen in a wildland fire. Unfortunately, there is no safe way to visually document the effects of fire on the most readily available types of refuge, namely vehicles and other man-made shelters. It is uncertain which option offers the best protection in a situation when mere seconds count. Therefore, cameras must be used to visually document what happens inside or very near these structures as intense flames sweeps over them.

Conventional cameras cannot withstand exposure to the 1100 degree centigrade temperatures that wildland fires are capable of reaching; thus, fire researchers need to protect their camera equipment from the intense flames of a wildland fire. There exists apparatuses for use inside a steady-state, high-temperature environment, such as a 1200 degree centigrade blast furnace. Such apparatuses employ complex and expensive active cooling systems of circulating air and water. However, these cooling systems require readily available plumbing and electricity. These apparatuses also employ indirect optical systems to reflect visible light into a camera lens, therefore, one must position the camera very precisely. The required precision makes it difficult to use the same protective enclosure for different camera types.

SUMMARY OF THE INVENTION

The present invention provides camera protection for researchers that visually document fires in remote areas. Fire research cameras are subjected to intense 1100 degree centigrade temperatures. However, these cameras can be protected with an inexpensive container that is passively cooled. Thus, an object of the invention is to protect a camera from intermittent, high-temperature fire environments in remote locations where there is no access to running water or electricity.

Generally, the present invention includes a closeable heat-resistant box having a window. Specifically, the box is partly comprised of an outer, heat-reflecting shell lined with an insulating material. The insulation panel exposed to the inside of the enclosure is covered with a protective liner. This liner prevents undue wear and tear to the insulation, and prevents insulation "dust" from entering the camera mechanisms. The enclosure can be designed specifically for one camera model, or it can be designed to easily accommodate many different camera types, either still or video. To allow access to the interior of the enclosure for camera maintenance or replacement, further provided is a removable insulated lid.

The window of the present invention allows visible light to enter the enclosure while simultaneously blocking heat transmission. This window is comprised of two plates. The outermost plate is a heat-resistant glass. The second, innermost plate is a hot mirror which serves to reflect infrared-radiation from entering the interior of the enclosure. To avoid pressure build-up between the two plates, a vent permitting air flow to the interior space of enclosure is located at a point between the two plates.

For versatility in the field, further aspects of the invention include: a passive cooling system of frozen liquid sealed in a container to absorb heat generated by the camera; an interior equipment mount to simplify placement of interior components, and further assist cooling by conducting heat away from camera; exterior mounts for attachment to a tripod or other supports; an opening for a cable-connection to provide electrical access to remote camera equipment; and a protective sleeve to insulate the cable connection.

The method for using the self-contained protective camera enclosure is given to instruct users how to set up equipment for remote fire documentation. The method uses either self-contained or remote-controlled camera equipment with the enclosure.

Still other objects of the present invention will become readily apparent to those skilled in this art from the following description wherein, where there is shown and described a preferred embodiment of this invention, simply by way of illustration one of the modes to best carry out the invention. As it will be realized, the invention is capable of other different embodiments and its several details are capable of modification in various, obvious aspects all without departing from the invention. Accordingly, the drawings and descriptions will be regarded as illustrative in nature and not restrictive.

DESCRIPTION OF THE PREFERRED EMBODIMENT

Figure 1:
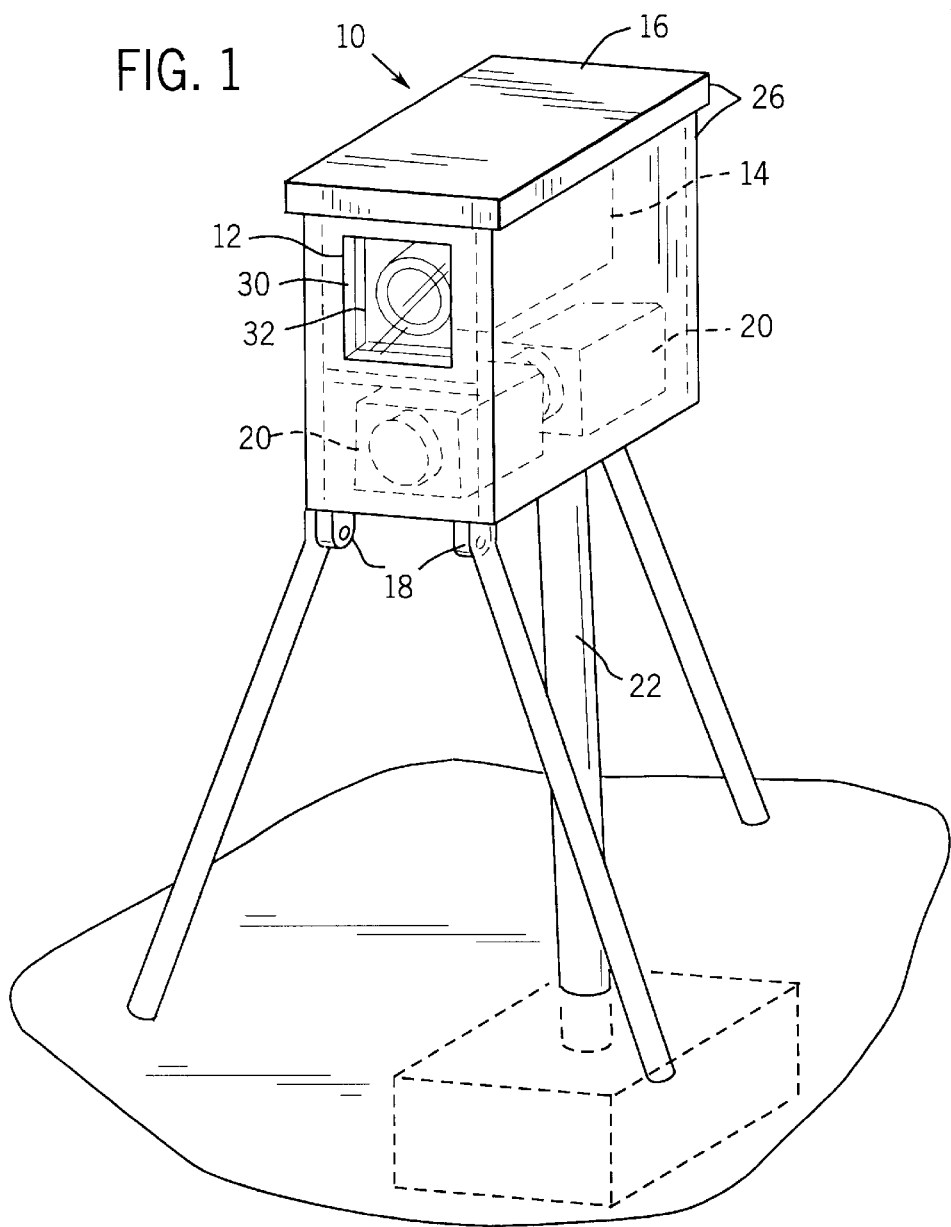
FIG. 1 is a perspective view of an embodiment of the enclosure of the present invention which incorporates a tripod mount and insulated cable-connection to remote electronic equipment.

FIG. 1 is a perspective view of the self-contained protective camera enclosure 10 of the present invention. The enclosure 10 is a rectangular parallelepiped, having an interior and a window 12 on its front face. Window 12 allows visible light to enter the camera 14 located within enclosure 10, as camera 14 faces window 12. One skilled in the art may appreciate that camera 14 may be of any type, either a conventional still camera or a video camera, because enclosure 10 may be constructed to accommodate different shapes and sizes of interior components. The enclosure 10 further includes an insulated lid 16, located on the topside of enclosure 10. Lid 16 permits access to the interior for maintenance or replacement of camera 14 or other components. Three connectors 18 are located on the bottom-side of enclosure 10 for mounting enclosure 10 on a tripod. Connectors 18 could be mounted elsewhere on the enclosure to accommodate other forms of support. Further accommodation for camera 14 is provided two ways. First, a passive-cooling system 20 is located within the enclosure 10 to absorb any heat generated by camera 14, particularly if it is a video camera that must consume energy to operate. Second, protective sleeve 22 thermally protects cables possibly required by camera 14 for exchange of electrical signals with any remote camera circuitry. Sleeve 22 coaxially surrounds the exposed portion of any such cable, therefore, sleeve 22 extends from the exterior of enclosure 10 to a point where the cable is no longer subject to destructive temperatures.

A. Construction of the Preferred Embodiments
1. The Heat-Resistant Box

Figure 2:
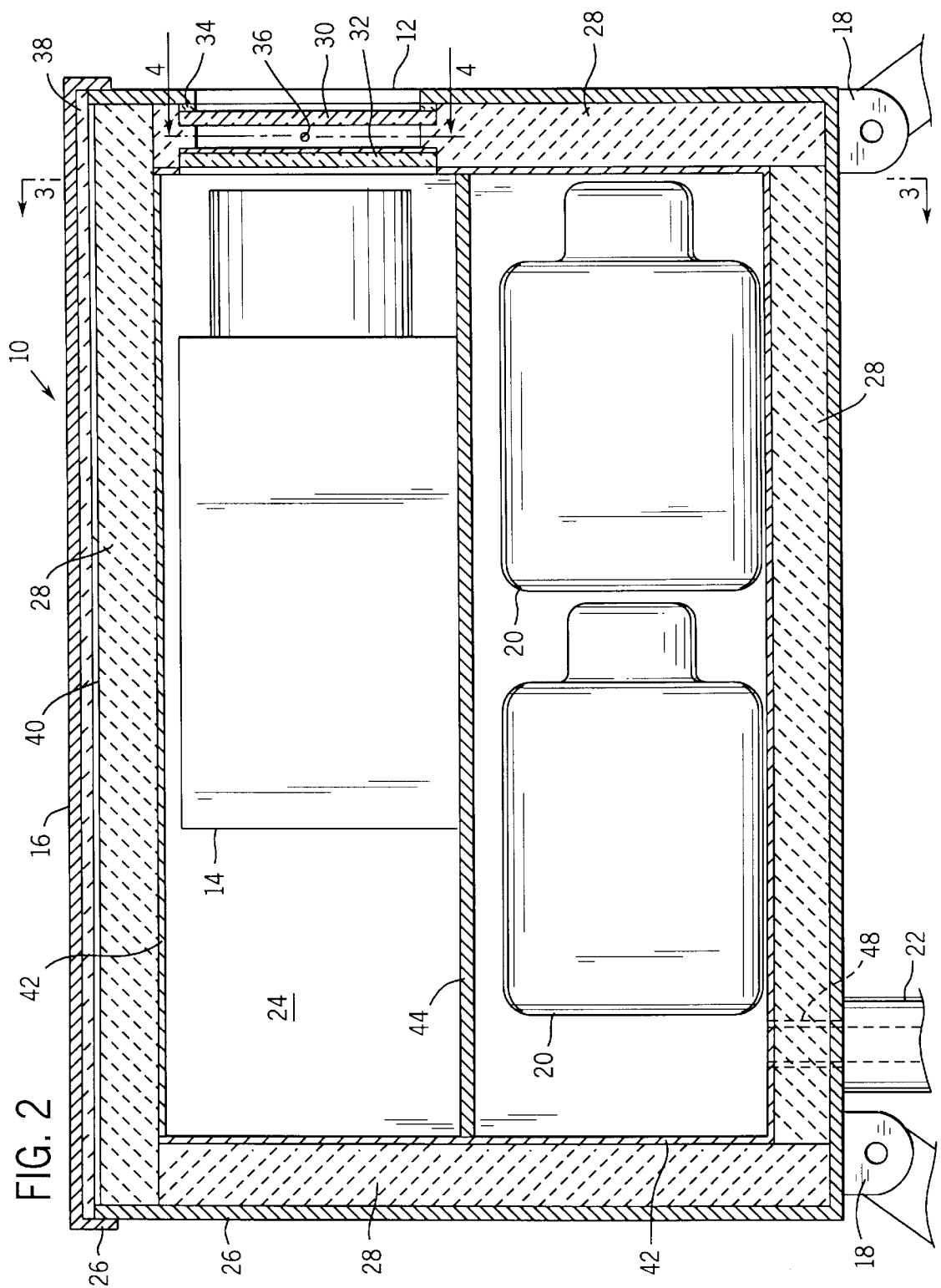
FIG. 2 is a cross-sectional side view of an embodiment of the enclosure according to the present invention showing placement of camera in relation to window and optional passive cooling system.

FIG. 2 is a cross-sectional side view of enclosure 10. As previously described, enclosure 10 is generally a heat resistant box with an insulated lid 16, an interior space 24, and window 12. Specifically, the heat-resistant box has an outer, heat-reflecting shell 26 of a reflective material, such as polished 15-gauge stainless steel (type 306), characterized by its ability to reflect radiant heat, rigidity, durability and formability. Shell 26 is formed from the stainless steel to create an open, rectangular box having a bottom. Each seam of the box is welded together. One wall of shell 26 supports a window, preferably a rectangular window, located to align with the camera's optical system when camera 14 is placed inside enclosure 10.

Shell 26 is lined with an insulating panel 28, such as a 2.5 centimeter thick ceramic board available from Cotronics Corporation, characterized by its ability to withstand steady-state temperatures of 1260 degrees centigrade, low thermal conductivity, resistance to thermal shock, and machinability. One skilled in the art will appreciate that more or less insulation is needed depending on the heat-reflecting capability of shell 26, among other variables. The purpose of the insulation is to keep interior space 24 at or below the maximum operating temperature of the enclosed camera 14, approximately 52 degrees centigrade Insulating panel 28 lines the bottom and all four sides of shell 26. This is done by cutting five rectangular pieces of ceramic board material: one piece for the bottom, the other four pieces for each wall of enclosure 10. When in place, the panels rest against the walls of shell 26. Furthermore, the panel sides are not mitered, dovetailed or fit together by any method that would require one to handle each panel extensively, as they tend to crumble and abrade with extensive handling. Each piece is cut to allow a friction-fit which is best accomplished when each side piece contacts the bottom of shell 26.

Figure 4:
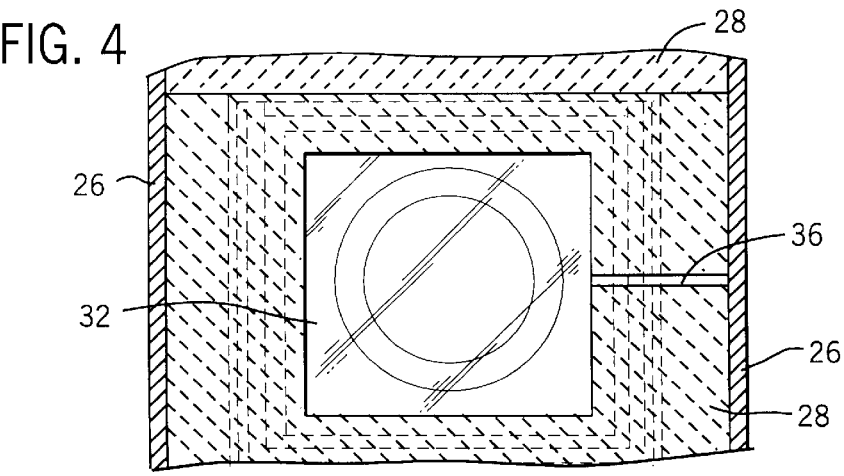
FIG. 4 is a cross-sectional front view taken along section 4—4 of the enclosure in FIG. 2 specifically showing the vent located between the window plates.

The piece of insulation panel 28 supporting window 12 must be cut to accommodate two rectangular plates, specifically, an outer heat-resistant glass plate 30, and a hot mirror 32. The width and height of both plates are larger than window 12 by a predetermined amount, for instance, four millimeters thick. This provides lateral support to both plates. Furthermore, the following criteria are met: (1) both cuts are made into the panel with window 12 to a dimension that achieves a friction fit, (2) all four sides of each plate are framed by the insulation panel, (3) the surface of the plates are parallel and maintained apart at a pre-determined distance, (4) the outermost surface of glass plate 30 is countersunk with respect to the supporting panel surface, to allow room for gasket 34 which provides a cushion between glass plate 30 and shell 26, and (5) the innermost surface of reflecting plate 32 is flush with respect to the inner supporting panel surface. For extra security, both plates are glued into place with a silicon adhesive that can withstand high-temperatures of up to 343 degrees centigrade. Gasket 34 is preferably made of woven ceramic fabric, characterized by its ability to provide cushioning, ability to withstand direct flame temperatures of 1200 degrees centigrade, and its low thermal conductivity. Referring to FIG. 2 and FIG. 4, at least one vent 36 is provided to allow the air pressure between the plates to equilibrate to the air pressure of interior space 24. Vent 36 is a shaft approximately one millimeter in diameter, running through insulation panel 28 so that it is nearly parallel to the surface of enclosure 10 supporting window 12. The vent leads to the small gap between the wall of insulation panel 28 and shell 26. The space between the somewhat porous insulation panel 28 and shell 26 is adequate to relieve the pressure buildup between the two plates.

Preferably, glass plate 30, and reflecting plate 32 are comprised of stock materials. Glass plate 30 is Corning Vycor® Flat Glass 7913. This glass can withstand high thermal shock and steady-state temperatures of 900 degrees centigrade, and has optical characteristics which will not hinder the quality of films or photographs taken by enclosed camera 14. Hot mirror 32 is three-millimeter thick heat-resistant glass, coated with a multilayer dielectric coating. Hot mirror 32 is capable of transmitting 90% visible light (400 to 700 nm) while reflecting 98% of infrared light (>700 nm), and is heat resistant up to 232 degrees centigrade. The metal coating of hot 32 mirror should face outward.

Referring to FIG. 2, a protective liner 42, preferably an aluminized sheeting, such as a bilaminate of aluminum foil and fiberglass cloth used for fire shelters (USDA Forest Service design specification #5100-321F), is used to cover all exposed insulating panel 28 surfaces within the interior space 24. Liner 42 serves to protect the insulating panel 28, which can have a tendency to dent and abrade easily due to the physical characteristics which define it as an insulator. Furthermore, liner 42 also prevents dust resulting from panel 28 damage from harming camera 14. Liner 42 is attached to the bottom and four sides of the box with a silicone adhesive that is resistant to temperatures of up to 343 degrees centigrade. Liner 42 is also attached to the surface of lid panel 40 that remains exposed after sealing enclosure 10. Once liner 42 is adhered to each appropriate surface, it should provide a smooth, cleanable surface that resists abrasion.

Figure 3A:
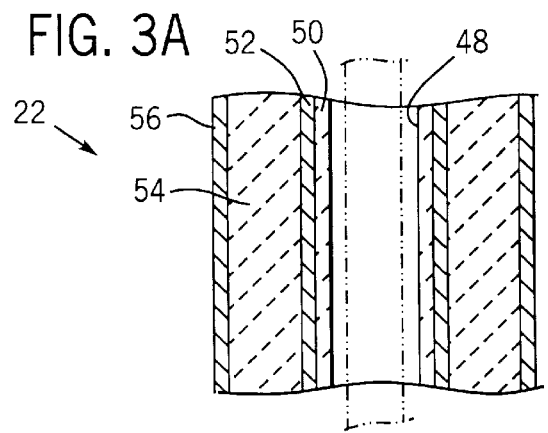
FIG. 3A is a cross-section of the protective sleeving.
Figure 3:
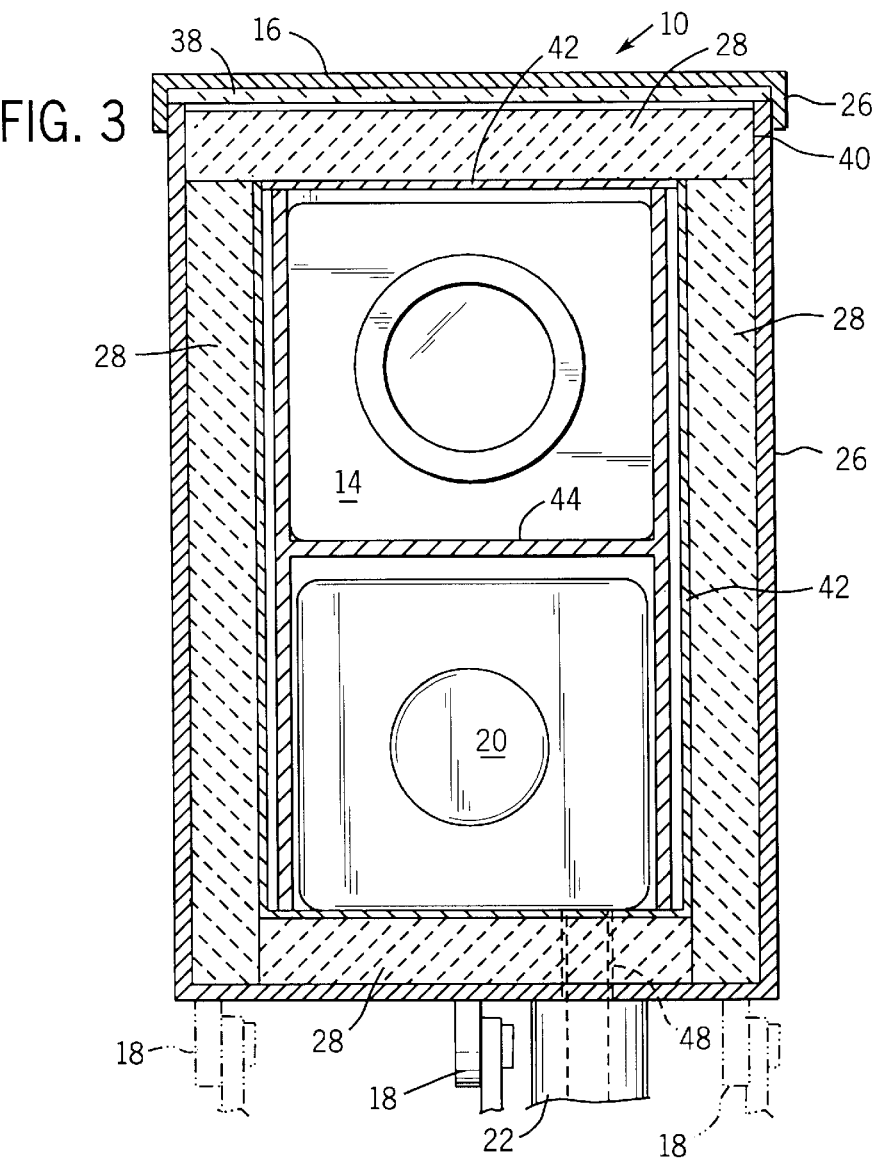
FIG. 3 is a cross-section front view taken along section 3—3 of the enclosure in FIG. 2 showing camera positioned on the interior mount

Referring now to FIG. 2 and FIG. 3, the present invention further includes insulated lid 16. Lid 16 comprises part of shell 26, and is made of the same shell 26 material to achieve a matched coefficient of expansion. The lid 16 ideally has a lip, like that of a conventional shoe box, which extends approximately one centimeter down each side of the box. Lid 16 is toleranced to fit the box in such a manner that it is easily removable without tools. Two stainless steel latches (not shown) located on opposite sides are used to secure lid 16. To further seal out heat and smoke, a sheet of ceramic fabric 38 is placed on the interior side of the lid 16. Ceramic fabric 38 attached to lid 16 with tape capable of holding objects secure in temperatures of up to 230 degrees centigrade. However, if the tape were to fail due to higher temperatures, lid 16 holds ceramic fabric 38 in place. Lid 16 is primarily insulated from interior space 24 by a separate lid panel 40 comprised of the same ceramic board as insulating panel 28. Panel 40 should just fit the inside dimension of shell 26, but be toleranced for slight ease of removal. The four side panels of insulating panel 28 should be of an identical height and allow an air gap of approximately two millimeters between the inner surface of lid 16 and top surface of panel 40. The purpose of this gap is to provide space for ceramic fabric 38.

2. The Equipment Mount

Referring to FIG. 3, an interior mount 44 may be added to provide support, aid placement and cool interior components. Mount 44 is preferably fabricated from a sheet of aluminum alloy, characterized by its high thermal conductivity and rigidity. By using a material having high thermal conductivity, heat generated by camera 14 may be conducted away for more efficient absorption by passive cooling system 20. The thickness of the aluminum mount is determined by the cooling requirements of the specific camera used; a camera requiring more cooling will require a mount of greater mass to act as a more effective heat sink. The shape of mount 44 is determined by the shapes of the enclosure 10 and camera 14. Typically, one will be constructing enclosure 10 from flat panel materials, therefore enclosure 10 will likely be a rectangular parallelepiped. In such cases, mount 44 can be constructed from two rectangular panels dimensioned so both length and height are six millimeters less than the exposed surface of panel 28 side panels. The two panels are spaced apart so their faces are parallel. The space is maintained by a flat surface positioned perpendicularly with respect the surfaces of the other panels, and horizontally with respect to the bottom of enclosure 10. The resulting front profile resembles an "H," however, the flat surface on which the camera rests is placed at a height to align camera 14 with window and prevent camera 14 from contacting lid panel 40 when enclosure is sealed. Ideally, camera 14 should be contact as much of mount 44 as possible to conduct heat away from the camera in the most effective manner; therefore, three surfaces of camera should contact mount 44. The corners of mount 44 sides should be rounded to prevent damage to liner 42.

3. The Passive Cooling System

Referring to FIG. 3, a passive cooling system 20 is placed within the available interior space 24. Cooling system 20 absorbs heat generated by camera 14, in particular the heat generated by a video camera. If camera 14 does not generate heat, the use of cooling system 20 is optional but recommended as it still provides protection against the heat surrounding enclosure 10. Cooling system 20 is made by filling one or more sealable containers with liquid, such as a solution of propylene glycol and water mixed in a ratio such that the solution freezes at −6.7 to −12.2 degrees centigrade. This is commercially available as Blue Ice®. A volume of at least one-half liter of the frozen propylene glycol solution is recommended. The cooling system passively operates on the principle that energy must be absorbed to effect a phase change turning the frozen solid to liquid. This provides more efficient cooling than does a material which would not experience such a phase change in the operating conditions found in the enclosure 10. However, it is undesirable to effect a phase change to create the release of gas within enclosure 10. Such gases and accompanying vapors could disrupt the lid 16 seal and interfere with the operation of camera 14.

4. A Second Embodiment Including an Opening and Protective Sleeving for Cable Connection Referring to FIG. 2 and FIG. 3A, another preferred embodiment of the present invention adds an opening 48 to the first embodiment for camera 14 to exchange electrical signals with remote camera circuitry through a cable. To protect any cable connection extending from enclosure 10, a plurality of materials generally referred to as protective sleeve 22, coaxially surrounds the exposed cable surface. The innermost layer of protective sleeve 22 is comprised of a woven ceramic sleeving 50. Next, the cable and ceramic sleeving 50 assembly is place in a flexible steel conduit 52. A third layer is comprised of ceramic blanket 54, characterized by its ability to withstand steady-state temperatures of 1650 degrees centigrade. Blanket 54 is wrapped around the entire length of conduit 52, and fastened in place with stainless steel wire. The wire should not crush blanket 54 in such a way as to diminish its insulating capability. Lastly, an outermost layer of aluminized sheeting 56, preferably a bilaminate of aluminum foil and fiberglass cloth used for fire shelters (USDA Forest Service design specification #5100-321F), is wrapped around the entire assembly, and fastened with stainless steel wire.

B. The Preferred Method

A method for documenting intermittent wildland fires and burning structures is described. When using a remote-controlled camera, or more generally, a camera 14 connected physically by a cable to remote camera equipment, one must use the second embodiment of the preferred invention. Because a more complex method is required when using remote equipment, it will be described in detail. It will then be understood that self-contained cameras use the same method as described, except for those instructions requiring cable connections and remote camera equipment.

A conservative approach toward documenting fire uses the most dispensable equipment possible. For instance, rather than using a self-contained video camcorder (camera/recorder), one may use just a video camera, such as a Sony SSC-DC30 in the enclosure. The video signal from the camera connects by cable to a remote video tape recorder, such as a Sony Hi8 camcorder, CCD-TR700. This arrangement allows placement of the remote equipment in an area that will not be subject to fire, for instance, buried underground. If the camera were to become damaged by extreme temperatures, the video tape recording would be intact and less equipment would be lost because the remote system will likely not be affected.

Referring generally to FIG. 1, the self-contained protective enclosure 10 must be firmly mounted to a support that will keep the enclosure steady during use. One possible type of support is a tripod, attached to connections 18 with stainless steel bolts (not shown). The supported enclosure 10 must be placed two to three meters from the subject to avoid smoke obscuring the viewing axis directed at subject.

Equipment may be placed inside enclosure 10 either before or after attaching enclosure 10 to a support. First, cables used to connect camera 14 to remote equipment are routed through opening 48. Next, one places the passive cooling system 20 inside enclosure 10. As mentioned, the cooling system 20 is preferably frozen propylene glycol solution in sealed containers. Generally, a 3×20×15 centimeter sealed, stainless steel box lined with 2.5 centimeter ceramic board, containing a camera that consumes 4.5 watts of power, and mounted to 100 cubic centimeters of aluminum alloy 6061-T6, can experience an interior temperature increase of 24 degrees centigrade in two hours. In a relatively short period of time, the temperature inside enclosure 10 could be outside the camera's operating range. It is useful to use one-half liter of propylene glycol solution in this particular circumstance. More could be required if circumstances demand it, but it is suggested that the maximum amount possible be used.

Next, equipment mount 44 straddles passive cooling system 20 in such a manner that mount 44 rests firmly against the interior bottom of enclosure 10. Cables are routed to the rear of mount 44 and connected with camera 14. Camera 14 is then securely mounted to mount 44, preferably with a bolt connecting with the camera's mount. The camera's viewing axis should align with the axis of window 12.

The enclosure 10 is then sealed. First, lid panel 40 is put into place, liner side down. Ceramic fabric 38 is taped on the underside of lid 16 so that the edge of the fabric overlaps the opening of enclosure 10. Lid 16 is put into place over the opening, and latched shut. The edges of the ceramic fabric should not hang down past the lip of lid 16.

Referring to FIG. 3A, secure protective sleeve 22 to coaxially surround all exposed portions of the cable extending from enclosure 10. The protected cable is attached to the remote equipment, and the remote equipment is placed a protected area. Set the fire unless one is already active, and begin documenting just before the fire reaches the intended subject.

Many modifications of the preferred embodiments which will still be within the spirit and scope of the invention will be apparent to those with ordinary skill in the art. In order to apprise of the various embodiments that may fall within the scope of the invention, the following claims are made.

What is claim is:

1. A self-contained, protective camera enclosure for fire documentation, comprising:
   a) a heat-resistant metal box, with a lid and inner surfaces lined with an insulating material;
   b) a window comprised of a plurality of plates, positioned in line of a viewing axis, the outermost one of said plurality of plates comprising a heat-resistant glass plate, spaced apart in pre-determined distance from the innermost of said plates, said innermost plate comprising a hot mirror, said hot mirror facing outward;
   c) a vent, located between said plurality of plates, whereby air pressure between said plurality of plates may equilibrate to air pressure within said self-contained, protective camera enclosure;
   d) an equipment mount supporting a camera for receiving light through the plates along the axis located within said box, wherein said equipment mount is thermally conductive to draw heat away from an enclosed camera; and
   e) a sealable container removably positioned within the heat resistant metal box to be wholly contained therein and holding a freezeable phase-change material.

2. The self-contained, protective camera enclosure of claim 1 wherein said box includes heat-reflecting outer surfaces of stainless steel.

3. The self-contained, protective camera enclosure of claim 1, wherein said insulating material is ceramic board.

4. The self-contained, protective camera enclosure of claim 1 further including at least one connector for attaching said box to a supporting mount.

5. The self-contained, protective camera enclosure of claim 1 further including an opening whereby an enclosed camera, through a cable-connection, exchanges electrical signals with remote camera circuitry.

6. The self-contained, protective camera enclosure of claim 1 further including a protective sleeve to thermally protect a cable-connection, said protective sleeve comprised of a plurality of materials:
   a) a first, innermost one of said plurality of materials, comprising a woven-ceramic sleeving;
   b) a second, one of said plurality of materials, comprising a steel conduit;
   c) a third, one of said plurality of materials, comprising a ceramic blanket; and
   d) a fourth, outermost one of said plurality of materials, comprising an aluminized, flexible cloth, whereby said protective sleeve coaxially surrounds exposed portion of said cable-connection along its axis.

7. A method for documenting wildland fires and burning structures in wildland fires using a self-contained, protective camera enclosure for fire documentation, which comprises;
   a) providing a heat-resistant metal box with a lid and inner surfaces lined with an insulating material;
   b) providing a window in said box including a plurality of plates, positioned in line with a viewing axis, the outermost one of said plates comprising a heat resistant glass plate, spaced apart a pre-determined distance from the innermost of said plates, said innermost plate comprising a hot mirror, said hot mirror facing outward;
   c) venting the space between said plurality of plates;
   d) placing camera in said box, the box located in an environment intended to simulate a natural wildland fire;
   e) placing a predetermined quantity of frozen, passive cooling material within the box;
   f) sealing said box against smoke and flame; and
   g) setting fire and completing visual documentation within a predetermined operating time of the camera, said operating time dependent on the quality of recording medium placed in the camera.

* * * * *